United States Patent [19]

Cooley et al.

[11] Patent Number: 4,888,186

[45] Date of Patent: Dec. 19, 1989

[54] METHOD FOR PRODUCING FLAVORED POPCORN

[75] Inventors: Judith Cooley, Schaumburg, Ill.; Diane Douglas, Norwell, Mass.

[73] Assignee: Brady Enterprises Inc., E. Weymouth, Mass.

[21] Appl. No.: 177,762

[22] Filed: Apr. 5, 1988

[51] Int. Cl.[4] .......................... A23D 5/00; A23L 1/18
[52] U.S. Cl. ...................................... 426/99; 426/290; 426/609; 426/613; 426/625
[58] Field of Search ............... 426/290, 289, 609, 613, 426/99, 625, 96

[56] References Cited

U.S. PATENT DOCUMENTS

| | | | |
|---|---|---|---|
| 2,222,560 | 11/1940 | Clickner | 426/289 |
| 2,958,602 | 11/1960 | Gilmore | 426/290 |
| 3,094,947 | 6/1963 | Green et al. | 426/290 |
| 3,764,346 | 10/1973 | Noznick et al. | 426/213 |
| 3,882,255 | 5/1975 | Gorham, Jr. et al. | 426/235 |
| 3,892,880 | 7/1975 | Grolitsch | 426/609 |
| 3,973,046 | 8/1976 | Mol | 426/289 |
| 3,992,555 | 11/1976 | Kovacs | 426/72 |
| 3,992,556 | 11/1976 | Kovacs et al. | 426/72 |
| 4,096,281 | 6/1978 | Young et al. | 426/89 |
| 4,163,066 | 7/1979 | Mason et al. | 426/99 |
| 4,728,520 | 3/1988 | Yamaya | 426/289 |

OTHER PUBLICATIONS

Durkee Product Data Sheet, Kaorich High Solids Beaded Shortening, IND-245G, Supersedes 245F, Durkee Industrial Foods, SCM Corporation, Cleveland, Ohio, 44115, 7/85.

*Primary Examiner*—Wilbur Bascomb
*Attorney, Agent, or Firm*—Wolf, Greenfield & Sacks

[57] ABSTRACT

A method for applying flavoring to food such as popcorn. A fat-flavor system is prepared by dry-blending solid particles of fat with a flavoring. The fat has a melting point of no less than about 95° F. so that the fat-flavor system comprises free-flowing particles at room temperature. The fat-flavor system is sprinkled onto hot, popped corn wherein the fat melts and the flavoring is adhered to the popcorn producing a flavored popcorn having an even flavor distribution and without a waxy-mouth feel.

12 Claims, No Drawings

METHOD FOR PRODUCING FLAVORED POPCORN

BACKGROUND OF THE INVENTION

This invention concerns a method for applying flavoring to a food and more particularly to a method for preparing flavored popcorn.

Gourmet popcorn having a variety of flavors is very popular and is commercially available at retail stores. It would be desirable to provide a method for making gourmet flavored popcorn in the home which is easy to prepare, has an even-flavor distribution, and does not leave a waxy feel in the mouth.

It would be further desirable if this method for applying flavoring were applicable to heated foods other than popcorn, such as vegetables, potatoes, pasta, rice, or meats.

The method of this invention provides the above-identified benefits.

SUMMARY OF THE INVENTION

This invention concerns a method for applying flavoring to a food by preparing a dry-blended fat-flavor mixture in particulate form and sprinkling it on a heated base food. The method is simple and convenient, produces an even flavor distribution, and in contrast to prior known methods for applying flavorings, does not require applying the flavoring while cooking the food in a liquid fat.

A fat-flavor system in particulate form is prepared by dry-blending finely divided solid particles of an edible, metabolizable fat with a flavoring, wherein the fat particles have a melting point of at least about 95° F. The base food is processed to a temperature of at least about 95° F. and the fat-flavor system is applied to the base food, for example, by shaking thereon. The fat-flavor system is maintained in contact with the base food for a time sufficient to permit at least a portion of the fat to melt on the base food.

In a preferred embodiment, the method is useful for producing flavored popcorn having an evenly distributed flavor and which does not leave a waxy feel in the mouth. The fat-flavor system contains about 15 to 75% by weight of a beaded fat consisting of one or more partially hydrogenated vegetable oils, such as cottonseed and soybean oils.

DETAILED DESCRIPTION OF THE PREFERRED EMBODIMENT

A preferred embodiment of this invention is a method for applying flavoring to popcorn as hereinafter described. It is understood that the method is also useful for applying flavoring to a variety of heated foods, such as vegetables, potatoes, pasta, rice, or cooked meats.

A fat-flavor system is prepared by dry-blending finely divided solid particles of fat, preferably in beaded or powdered form, with a flavoring. The fat must be stable and remain in its beaded or powdered form at room temperature. It must have a melting point of no less than about 95° F. so that the product is shelf stable at summer temperatures. In preparing flavored popcorn, the melting point of the fat is preferably no greater than about 145° F. so that the popcorn is hot enough to partially melt the fat.

Preferably, the fat is a beaded fat comprising a mixture of partially hydrogenated vegetable oils such as cottonseed and soybean oils. Such a beaded fat is commercially available from Durkee Industrial Foods, SCM Corporation, Cleveland, Ohio, under the designation KAORICH high solids beaded shortening. The KAORICH beaded shortening has the following properties:

| TYPICAL DATA | |
| --- | --- |
| Capillary Melting Point | 124°–130° F. |
| Color (Lovibond) | 2.5 Red (Max.) |
| Free Fatty Acids | 0.1% (Max.) |
| A.O.M. Stability | 200 Hours (Min.) |

| TYPICAL SOLID FAT INDEX | |
| --- | --- |
| Temperature °F. | Solids |
| 50 | 80 |
| 70 | 80 |
| 80 | 80 |
| 92 | 80 |
| 100 | 77 |
| 110 | 62 |

The fat must be present in sufficient amounts to adhere the flavoring to the popped corn. The fat should thus constitute of from about 15 to about 75% of the fat-flavor system. A typical formula is approximately 50% fat and 50% flavoring.

For example, the fat-flavor system may consist of 45.3% KAORICH shortening, 49.4% of a solid sour cream and onion seasoning blend, and 5.3% of a fine-flake prepared salt. This fat-flavor system will remain free flowing at or below ambient temperatures of about 95° F. and may be packaged in composite cans with both an inner and outer foil liner and a shaker top.

The fat-flavor system is applied to hot popped corn of a temperature of at least 95° F., whereby the fat will be melted by the heat from the popcorn causing the flavoring to adhere to the popcorn. For corn popped in oil in a conventional corn popper, the fat-flavor system may be shaken onto the hot, popped corn immediately after popping, and the mixture stirred and served. For popcorn prepared in a microwave oven, the fat-flavor system is shaken onto the popcorn in the bag immediately after the popcorn has been popped, and the mixture stirred and served. For popcorn prepared in a hot air popper, the fat-flavor system may be shaken directly onto the popped corn as it comes from the popper and lands in the bowl. After all the corn has popped, it is preferable to allow hot air to blow into the bowl for 30 seconds to further assist in melting the fat. The mixture is then stirred and served. In all instances, the fat in the flavor system melts upon contact with the hot, popped corn. The seasoning in the flavor system is caught by the melting fat and is bound to the popped corn. This method produces popcorn having an even flavor distribution wherein the flavor is adhered to the popcorn and does not leave a waxy-mouth feel.

Although a preferred embodiment of the invention has hereinbefore been described, it will be appreciated that variations of this invention will be perceived by those skilled in the art, which variations are nevertheless within the scope of this invention as defined by the claims appended hereto.

We claim:

1. A method for applying flavoring to a food comprising:

preparing a fat-flavor system in particulate form by dry-blending solid particles of an edible, metabolizable fat with a flavoring wherein said fat particles have a melting point of no less than about 95° F.;

processing a base food to a temperature of at least about 95° F.;

applying the fat-flavor system to the base food while at said temperature; and maintaining said fat-flavor system in contact with said base food for a time sufficient to permit at least a portion of said fat to melt and adhere the flavoring to said base food.

2. The method of claim 1 wherein the fat comprises of from about 15 to about 75% by weight of the fat-flavor system.

3. The method of claim 2 wherein the fat comprises at least one partially hydrogenated vegetable oil.

4. The method of claim 3 wherein the vegetable oil is selected from the group consisting of cottonseed, soybean and mixtures thereof.

5. The method of claim 4 wherein the fat is beaded or powdered.

6. A method for applying flavoring to popcorn comprising:

preparing a fat-flavor system in particulate form by dry-blending solid particles of an edible, metabolizable fat with a flavoring wherein said fat particles have a melting point of no less than about 95° F.;

processing popcorn to a temperature of at least about 95° F.;

applying the fat-flavor system to the popcorn while at said temperature; and maintaining said fat-flavor system in contact with said popcorn for a time sufficient to permit at least a portion of said fat to melt and adhere the flavoring to said popcorn;

wherein the fat comprises of from about 15 to about 75% by weight of the fat-flavor system;

wherein the fat comprises at least one partially hydrogenated vegetable oil selected from the group consisting of cotton-seed, soybean and mixtures thereof; and wherein the fat is beaded or powdered.

7. The method of claim 6 wherein the fat has a melting point of no greater than about 145° F.

8. A method for applying flavoring to a food comprising:

preparing a fat-flavor system in particulate form by dry-blending solid particles of an edible, metabolizable fat with a flavoring wherein said fat particles have a melting point of no less than about 95° F.;

processing a base food to a temperature of at least about 95° F.;

applying the fat-flavor system to the base food while at said temperature;

maintaining said fat-flavor system in contact with said base food for a time sufficient to permit at least a portion of said fat to melt and adhere the flavoring to said base food; and applying hot air at a temperature of no less than about 95° F. after the fat-flavor system is applied to the base food to assist in melting the fat on the base food.

9. A method for preparing flavored food particles comprising:

preparing a fat-flavor system in particulate form by dry-blending solid particles of an edible, metabolizable fat with a flavoring, wherein said fat particles have a melting point of no less than about 95° F. and the fat comprises of from about 15 to about 75% by weight of the fat-flavor system;

processing base food particles to a temperature of at least about 95° F.;

applying the fat-flavor system to the surfaces of the base food particles so as to achieve a fairly uniform distribution of the fat-flavor system on the base food particles while the base food particles are at said temperature; and maintaining said fat-flavor system in contact with said base food particles for a time sufficient to permit at least a portion of the fat to melt and adhere the flavoring to the surfaces of said base food particles.

10. A method of producing flavored popcorn comprising:

preparing a fat-flavor system in particulate form by dry-blending solid particles of an edible, metabolizable fat with a flavoring, said fat comprising at least one partially hydrogenated vegetable oil and said fat particles having a melting point of no less than about 95° F., the fat comprising of from about 15 to about 75% by weight of the fat-flavor system;

processing popcorn to a temperature of at least about 95° F.;

applying the fat-flavor system to the surfaces of the popcorn while at said temperature; and maintaining said fat-flavor system in contact with said popcorn for a time sufficient to permit at least a portion of said fat to melt and adhere the flavoring to the surfaces of said popcorn.

11. The method of claim 10, wherein the processing step comprises popping kernels of corn at an elevated temperature to produce the popcorn and applying the fat-flavor system to the popcorn immediately thereafter before the popcorn has cooled to a temperature below about 95° F.

12. The method of claim 10, comprising the additional step of applying hot air at a temperature of no less than about 95° F. after the fat-flavor system is applied to the popcorn to assist in melting the fat on the popcorn.

* * * * *